United States Patent [19]

Grasso

[11] 4,355,674
[45] Oct. 26, 1982

[54] APPARATUS FOR SEPARATING CASINGS FROM TIRE RIMS

[76] Inventor: Joseph F. Grasso, 119 Ridge St., Rome, N.Y. 13440

[21] Appl. No.: 227,627

[22] Filed: Jan. 23, 1981

[51] Int. Cl.³ .............................................. B60C 25/06
[52] U.S. Cl. ..................................................... 157/1.2
[58] Field of Search .......................... 157/1.1, 1.17, 1.2, 157/1.26, 1.28

[56] References Cited

U.S. PATENT DOCUMENTS

| | | | |
|---|---|---|---|
| 2,873,795 | 2/1959 | Kleparchuk | 157/1.17 |
| 2,898,977 | 8/1959 | Denn | 157/1.17 X |
| 4,083,394 | 4/1978 | Heikkinen et al. | 157/1.21 |
| 4,226,275 | 10/1980 | Robins | 157/1.2 |
| 4,306,606 | 12/1981 | Grasso | 157/1.1 |

Primary Examiner—James G. Smith
Attorney, Agent, or Firm—Bruns & Jenney

[57] ABSTRACT

Apparatus for removing the outer casing from the rim of a wheel so that each part of the wheel may be recovered separately for purposes of salvage or repair. The wheel is laid on its side upon a worktable having a circular opening formed therein with the rim of the wheel being positioned over the opening. A cylindrical clamping tool is brought down over the rim to engage the casing and securely clamp is against the top surface of the table. A knockout bar is passed down through the cylindrical clamping tool to contact the rim close to the bead-forming joint between the casing and the rim. Extension of the arm causes the bead to be broken and the rim to be forced away from the casing whereupon it falls through the opening in the worktable.

10 Claims, 4 Drawing Figures

4,355,674

APPARATUS FOR SEPARATING CASINGS FROM TIRE RIMS

BACKGROUND OF THE INVENTION

This invention relates to apparatus for automatically separating the casing of a wheel from the rim for the purpose of either salvaging or repairing the tire parts.

Although the present invention is well suited for use in repairing large truck tires or the like, it is ideally suited for use in the salvage industry for rapidly and efficiently removing a tire casing from a wheel rim so that each may be recovered individually. In order to gain complete separation of the casing from the rim, the bead that holds the casing to the rim must first be broken and the casing then forced over the flanged lip of the rim. As anyone who has attempted to repair a tire knows, both of these operations are extremely difficult to accomplish and ordinarily take a good deal of time. Semiautomatic devices similar to those disclosed in U.S. Pat. Nos. 2,898,977 and 2,873,795 have been used with varying degrees of success in an effort to more effectively provide separation of the casings from the rims. However, these devices are typically complex in both their structure and method of operation and, as a consequence, little economic gain is realized particularly when used in a salvage operation.

A tire stripping device has been developed specifically for use in the salvage industry and is described in U.S. Pat. No. 4,083,394. In operation, the tire that is to be stripped is centered upon a worktable between three circumferentially-spaced rams which are designed to drive wedge-like tools through the casing into the rim. Sufficient force is applied to the periphery of the rim to collapse the rim inwardly. The wedges are then retracted to permit the casing to be slipped over the crushed rim. Although the machine works quite well in separating the tire components, there still is a good deal of heavy manual work involved in lifting the tire over the rams during the tire loading and unloading operation. Final separation of the rim must also be achieved manually. This, of course, consumes considerable time, leads to operate fatigue and increases the cost of the salvage operation. It should also be noted that the rim is totally destroyed in the machine and can no longer be remounted upon a motor vehicle thereby losing part of its salvage value.

SUMMARY OF THE INVENTION

It is therefore an object of the present invention to improve apparatus used in the salvage and repair industry for separating casings from the rims of tires.

A further object of the present invention is to more fully automate a process for salvaging automobile tires.

A still further object of the present invention is to provide apparatus for rapidly and efficiently stripping the tire casings from wheel rims so that both might be economically salvaged.

Another object of the present invention is to automatically strip tire casings from wheel rims without seriously damaging the rims.

Yet another object of the present invention is to provide a tire stripping machine that can be loaded and unloaded with a minimum amount of work.

These and other objects of the present invention are attained by means of a tire stripping apparatus that includes a worktable having a circular opening formed therein upon which the tire to be stripped is laid upon its side with the rim positioned over the opening. A cylindrical clamping tool is movably positioned over the worktable and is arranged to move down over the rim and securely clamp the casing against the table. A knockout bar, which is also movably mounted over the worktable, is forced against the rim of the wheel to break the bead that holds the casing to the rim and drive the rim through the opening in the table.

BRIEF DESCRIPTION OF THE DRAWINGS

For a better understanding of these and other objects of the present invention reference is had to the following detailed description of the invention which is to be read in conjunction with the accompanying drawings, wherein.

DESCRIPTION OF THE INVENTION

Figure 1:
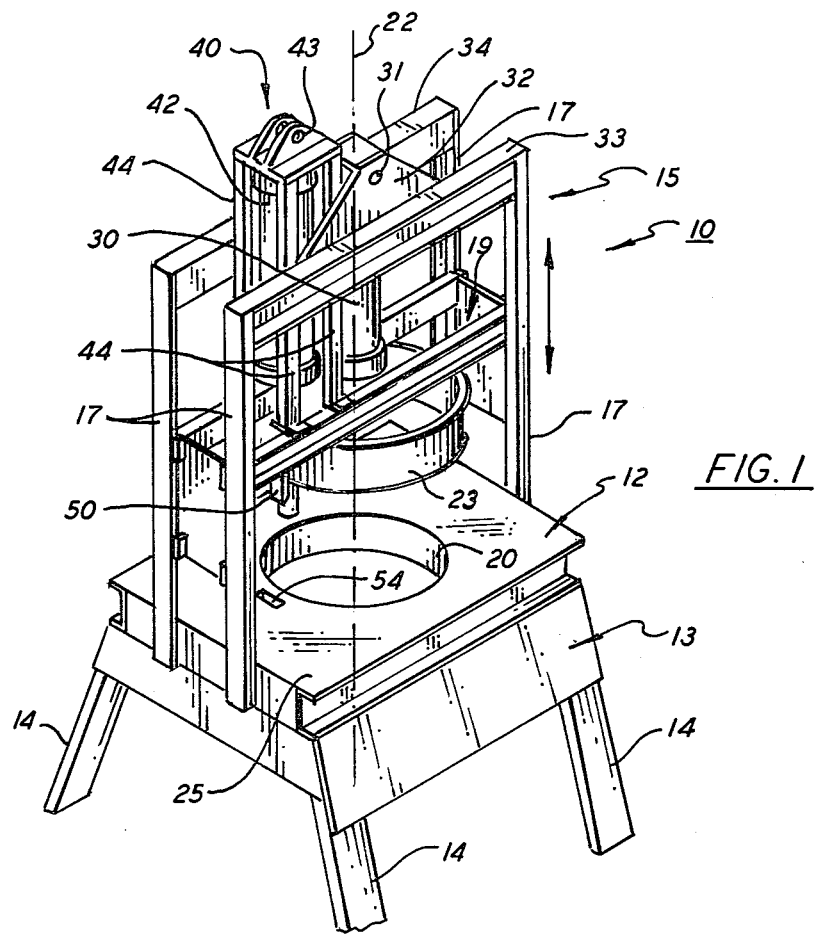
FIG. 1 is a perspective view of a tire stripping machine embodying the teachings of the present invention.

Referring now to the drawings and in particular to FIG. 1, there is shown a machine 10 for separating the casing from the rim of a wheel or tire so that the two may be recovered individually for the purposes of salvaging or repairing the parts. As will be explained in greater detail below, the apparatus of the present invention, although specifically designed for use in the salvage industry, can be used equally as well to remove the casings from the rims of large truck tires so that repairs can be made to the tires. The machine includes a horizontally aligned worktable 12 that is supported upon a rigid base 13 containing four legs 14—14 adapted to support the worktable some distance above the surface upon which the base is resting. A vertically extended frame generally designated 15 is raised above the table. The frame contains a plurality of vertical columns 17—17 that are adapted to movably support a slide mechanism 19 therein. The slide is guided between the columns so that it moves along a vertical path of travel towards and away from the top surface of the worktable as indicated by the arrows in FIG. 1. The structural members that form the worktable, base and overhead frame are all securely welded together in assembly to form a high strength, unitized structure.

Figure 2:
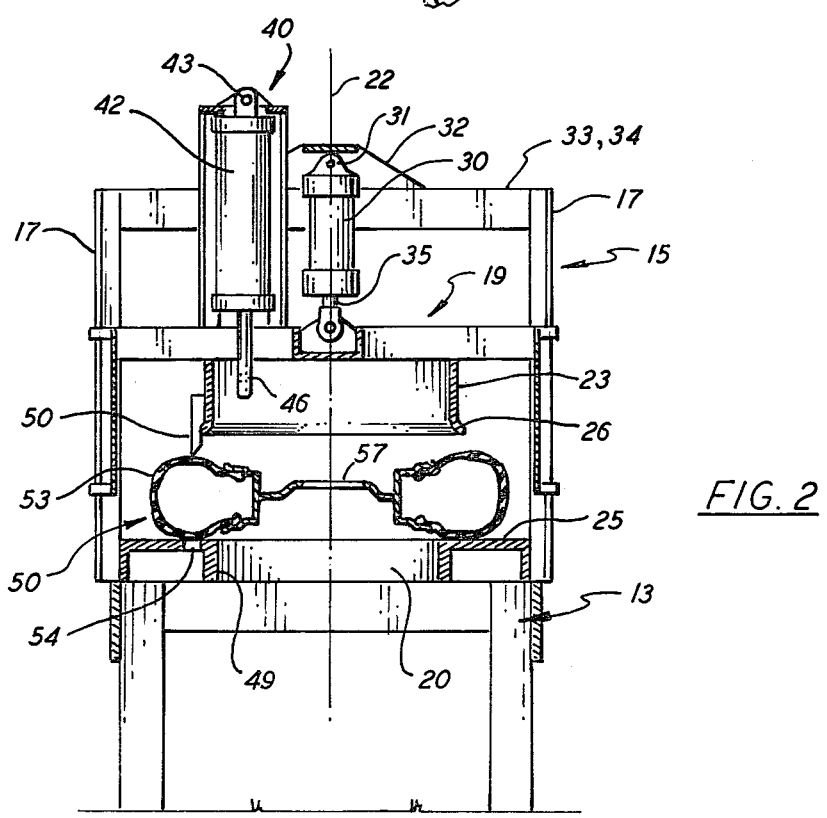
FIG. 2 is a side elevation in partial section showing the machine of FIG. 1 in a tire loading position with a tire situated upon the worktable thereof.
Figure 3:
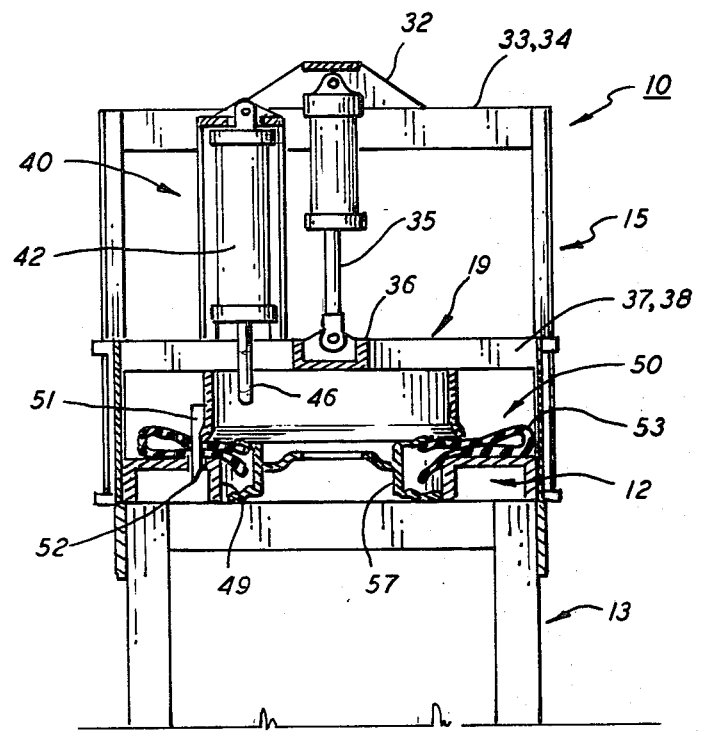
FIG. 3 is also a side elevation in partial section showing the instant machine in a tire clamping position wherein the casing of the tire is locked against the worktable of the machine by a cylindrical clamping tool.

A circular opening 20 is formed in the worktable with the opening being substantially coaxially aligned along the vertical axis 22 of the machine. A cylindrical clamping tool 23 is affixed to the slide mechansim. The clamping tool is also coaxially aligned with the vertical axis of the machine and thus situated directly over the opening formed in the table. The cylindrical tool is adapted to move vertically with the slide between a first loading position as illustrated in FIG. 2 and a clamping position as shown in FIG. 3. The inside diameter of the cylindrical tool is greater than the diameter of the opening formed in the table so that when the tool is brought into the clamping position, the lower edge of the tool will contact the top surface 25 of the table. As best seen in FIGS. 2 and 3, the lower edge of the cylinder is flared outwardly in a radial direction to form a circular lip 26 having a knife-edge surface that can be driven into contact with a tire casing to securely hold the casing to the table in a manner to be described in greater detail below.

The reciprocating slide is driven along its intended path of travel by means of a double-acting hydraulic cylinder 30. The proximal end of the hydraulic cylinder is hung by trunnion 31 within a yoke 32 which, in turn, is suspended between the upper cross bars 33,34 of the frame. The actuating arm 35 of the cylinder is pinned to a cross brace 36 welded between the top member 37 and 38 of the slide. The cylindrical tool is similarly welded to the bottom of the slide member 37 and 38 whereby extending and retracting of the cylinder arm causes the tool to move toward and away from the top surface of the worktable.

A knockout bar assembly, generally referenced 40, is also secured to the top members 37,38 of the slide for reciprocal movement therewith. The knockout assembly includes a bracket-type housing 41 that contains a second hydraulic cylinder 42 vertically suspended therein upon a pin 43. The vertical legs 44—44 of the bracket form a cage that restricts the movement of the cylinder within the bracket. An extendable knockout bar 46 is operably connected to the piston contained within the hydraulic cylinder. In assembly, the bracket is laterally offset in reference to the axis of the machine so that the bar passes into the opening formed in the worktable in close proximity with the sidewall 49 thereof.

Figure 4:
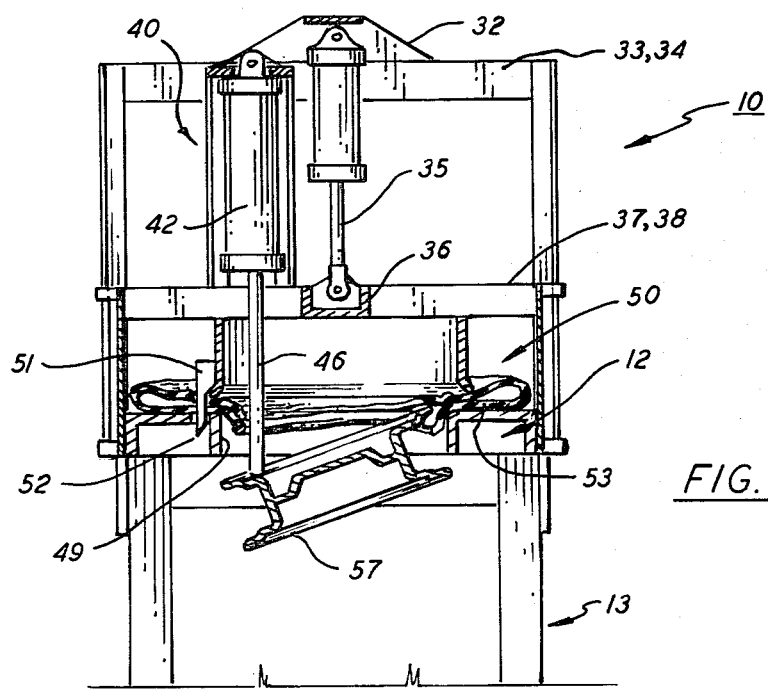
FIG. 4 is a further side elevation in partial section showing the present machine separating the rim of the tire from the casing.

Turning now more specifically to FIGS. 3–5, the operation of the subject machine shall be explained in greater detail. Initially, as illustrated in FIG. 3, the slide mechanism is raised well above the top surface of the worktable so that a tire 50 can be positioned as shown upon the table beneath the cylindrical clamping tool. At this time the knockout bar is retracted. The tire is laid upon its side over the circular opening provided in the table with the tire rim generally centered upon the vertical axis of the machine. In practice, the size of the table opening is larger than the diameter of the tire rim whereby the rim is able to pass through the opening when separation has been achieved.

With a tire centered over the table opening, the slide mechanism is moved by its associated drive cylinder from the loading position downwardly toward a clamping position. A puncture tool 51 may be secured as by welding to the outer surface of the clamping tool when the machine is used strictly for salvage purposes and reuse of the casing is not a consideration. The puncture tool is preferably a vertically aligned spike having a sharpened tip 52 that can easily penetrate the casing 53 to release whatever air may be entrapped therein. The puncture tool is arranged to pass through the casing into a complimentary opening 54 (FIG. 1) formed in the table to permit the clamping tool to be brought into contact against the top surface of the table. The puncture tool also serves to prevent the casing from moving laterally on the table as the rim is being separated therefrom.

The cylindrical clamping tool is passed over the outer periphery of the rim 57 into direct contact with the casing to collapse the casing as shown in FIG. 3. The knife-edge contact surface on the flanged lip 26 of the tool bites into the casing and securely locks the tire against the top of the table. The clamping action causes the lower bead joint between the casing and the rim to be broken and the lower portion of the rim is pushed downwardly into the table opening. Once the casing is locked to the table, the knockout bar is actuated causing the bar to be extended downwardly through the cylindrical clamping tool into contact with the tire rim. As best shown in FIG. 4, the distal end of the bar preferably contacts the outer periphery of the rim at a point directly over the top bead of the tire. Continued extension of the bar causes the rim to turn obliquely in regard to the casing so that it can be easily broken away from the casing. Full extension of the arm achieves complete separation of the rim from the casing whereupon the rim falls through the opening into a catch bin or onto a conveyor (not shown). It should be noted that the puncture tool is located close to the point where the knockout bar strikes the rim. This provides a relatively high holding force against the casing at the initial rim breakaway region which insures that the casing will not move as the rim is being forced through the table opening.

Although the present apparatus is for use in a salvage operation, it is easily adapted for use in removing casings from tire rims for the purpose of repairing the tire. When adapted for repair use, the puncture tool is removed from the machine and the travel of the clamping tool is restricted so that the casing is not locked against the table. The tire is supported within the machine upon a raised anvil which is placed on the worktable over the central opening. The anvil engages the center portion of the rim and serves to support the entire tire assembly above the table. Initially the clamping tool is brought down against the casing and the top bead is broken. The tool is raised to free the tire. If the tire includes a snap ring, the bead on the snap ring side of the tire is broken first and the ring is removed from the assembly. The tire is then turned over on the anvil and the clamping tool lowered over both the rim and the anvil to break the second bead and force the casing over the rim. By use of the anvil, destruction of the casing is avoided and repairs can be accomplished in a minimum amount of time.

While this invention has been described with reference to the details as set forth above, it is not limited to the specific structure as disclosed and the invention is intended to cover any modifications or changes as may come within the scope of the following claims.

I claim:

1. Apparatus for separating a casing from the rim of a wheel that includes
   a worktable for supporting a tire in a horizontal position thereupon, said worktable further having a circular opening passing therethrough that has a diameter greater than the outer diameter of the wheel rim and smaller than the outer diameter of the casing,
   a cylindrical clamping tool for passing over the outer periphery of the rim and securely locking the casing against the top surface of the worktable,
   drive means connected to the cylindrical clamping tool for moving the tool between a loading position over the top of the table wherein a wheel may be positioned over the opening in the worktable and a clamping position wherein the lower edge of the clamping tool securely locks the casing against the table, and an extendable bar positioned over the opening in the worktable that is arranged to move downwardly into the opening formed in said table to force the rim of a wheel positioned upon the worktable downwardly through the opening.

2. The apparatus of claim 1 that further includes at least one elongated spike-like member secured to the sidewall of the cylindrical clamping tool that depends below the lower edge of said tool for passing through the casing into a complimentary aperture formed in the table as the tool moves from a loading position into a clamping position.

3. The apparatus of claim 1 wherein said extendable bar includes a hydraulic cylinder for driving the bar downwardly into the opening and retracting it into its original position.

4. The apparatus of claim 1 wherein the lower edge of said cylindrical clamping tool contains a knife-edge surface for locking the casing against the table.

5. The apparatus of claim 1 further including a slide means positioned over the table that is operably connected to the cylindrical clamping tool for guiding said tool between the loading position and the clamping position.

6. Apparatus for separating the outer casing from the rim of a wheel that includes
a horizontal worktable having a circular opening formed therein for allowing the rim of a wheel situated upon said table to pass therethrough,
a support frame positioned over the worktable,
a slide movably mounted in the support frame having a vertically aligned cylindrical clamping tool secured therein,
first drive means for reciprocating the slide between a loading position wherein a wheel is mounted upon the table with its rim positioned over said opening and a clamping position wherein the casing is clamped by the bottom edge of the cylindrical tool against the table,
a vertically extendable knockout table also secured to the frame, and
a second drive means for extending the knockout tool from a retracted position over the worktable to an extended position into said opening to force the rim of a wheel supported upon the table through said opening.

7. The apparatus of claim 6 wherein said extendable knockout tool is secured to said slide for reciprocal movement therewith.

8. The apparatus of claim 7 wherein said knockout tool is a hydraulically actuated ram.

9. The apparatus of claim 6 that further includes puncture means secured to the slide for passing into the casing prior to the cylindrical clamping tool engaging said casing whereby air entrapped in the casing is released.

10. The apparatus of claim 10 wherein said puncture means is a spike-like member depending from the sidewall of the cylindrical clamping tool that is slidably received within a complimentary aperture formed in the worktable.

* * * * *